United States Patent [19]
Richeson

[11] Patent Number: 5,131,354
[45] Date of Patent: Jul. 21, 1992

[54] METHOD OF OPERATING A TWO-STROKE-CYCLE ENGINE WITH VARIABLE VALVE TIMING IN A FOUR-STROKE-CYCLE MODE

[75] Inventor: William E. Richeson, Fort Wayne, Ind.

[73] Assignee: North American Philips Corporation, New York, N.Y.

[21] Appl. No.: 697,845

[22] Filed: May 9, 1991

Related U.S. Application Data

[63] Continuation-in-part of Ser. No. 435,232, Nov. 9, 1989, Pat. No. 5,083,533.

[51] Int. Cl.⁵ ............... F02B 75/02; F02B 33/04; F02B 25/00
[52] U.S. Cl. ............... 123/76; 123/65 VC; 123/73 C
[58] Field of Search ............... 123/3, 21, 64, 65 VC, 123/65 BA, 317, 318, 76, 79 R, 73 C, 90.15

[56] References Cited

U.S. PATENT DOCUMENTS

| | | | |
|---|---|---|---|
| 1,433,650 | 10/1922 | Powell | 123/318 |
| 1,998,844 | 4/1935 | Russ | 123/318 |
| 2,097,883 | 11/1937 | Johansson | 123/90.15 |
| 2,705,480 | 4/1955 | Cambeis et al. | 123/65 VC |
| 2,820,339 | 1/1958 | Grieshaber et al. | 123/65 VC |
| 2,958,315 | 11/1960 | Williams | 123/65 VC |
| 2,962,009 | 11/1960 | Buchi | 123/65 VC |
| 3,499,425 | 3/1970 | Gommel | 123/318 |
| 4,392,459 | 7/1983 | Chareire | 123/318 |
| 4,700,684 | 10/1987 | Pischinger | 123/90.11 |
| 4,986,224 | 1/1991 | Zuffi | 123/76 |
| 4,993,372 | 2/1991 | Mott et al. | 123/65 VC |
| 4,995,350 | 2/1991 | Kumagai et al. | 123/65 VC |
| 5,000,133 | 3/1991 | Kawamura | 123/65 VC |
| 5,007,382 | 4/1991 | Kawamura | 123/21 |
| 5,025,765 | 6/1991 | Kawamura | 123/76 |
| 5,036,801 | 8/1991 | Imajou | 123/21 |
| 5,063,881 | 11/1991 | Kawamura | 123/65 VC |
| 5,080,081 | 1/1992 | Kawamura | 123/76 |
| 5,083,533 | 1/1992 | Richeson et al. | 123/65 VC |

*Primary Examiner*—David A. Okonsky
*Assistant Examiner*—Thomas N. Moulis

[57] ABSTRACT

Method for operating an engine having a piston reciprocable in a cylinder, an intake port for admitting air, an exhaust valve controlled by a valve actuator independently of crankshaft position, spark ignition, and fuel injection. During a first stroke the piston moves from BDC to TDC, the intake port is closed, the exhaust valve is closed, and fuel is injected. During a second stroke (TDC to BDC) the exhaust valve remains closed, lowering the pressure and causing some evaporation of the fuel-air mixture. During a third stroke (BDC to TDC), the fuel air mixture is again increased and finally ignited. During a fourth stroke (TDC to BDC) the ignited mixture expands, followed by opening the exhaust valve and the intake port. The second and third strokes enhance evaporation thus permit ignition of low vapor pressure fuel in a cold engine. Once the engine is hot, the valve actuators permit transition to a two-stroke-cycle.

5 Claims, 9 Drawing Sheets

METHOD OF OPERATING A TWO-STROKE-CYCLE ENGINE WITH VARIABLE VALVE TIMING IN A FOUR-STROKE-CYCLE MODE

This application is a continuation in part of U.S. application Ser. No. 435,232 filed Nov. 9, 1989, now U.S. Pat. No. 5,083,533.

BACKGROUND OF THE INVENTION

The present invention relates to a method of operating a two-stroke-cycle engine having a variably timed exhaust valve in a four-stroke-cycle mode. More particularly, the invention relates to an additional compression stroke and an additional expansion stroke in order to enhance vaporization of low vapor pressure fuels in a cold engine.

Internal combustion engine valves in four-stroke cycle engines are almost universally of a poppet type which are spring loaded toward a valve-closed position and opened against that spring bias by a cam on a rotating cam shaft with the cam shaft being synchronized with the engine crankshaft to achieve opening and closing at fixed preferred times in the engine cycle. This fixed timing is a compromise between the timing best suited for high engine speed and the timing best suited to lower speeds or engine idling speed. The valves in two-stroke-cycle engines are generally simple apertures or ports in the cylinder sidewall which are uncovered or opened by piston movement, however, exhaust valving of the cam actuated as well as other varieties have been suggested.

A two-stroke-cycle compression ignited (Diesel) engine utilizing a conventional cam actuated overhead valve as the exhaust valve with the traditional cylinder sidewall intake ports receiving pressurized scavenging air from a positive displacement (Roots) blower is known. The exhaust valving of this known Diesel engine suffers from the above defects, but when operated over a narrow range of speeds, it operates with relatively high efficiency since there are little or no throttling losses in its operation. It would be highly desirable to be able to operate a spark-ignited two-stroke-cycle engine over a wide range of speeds with little or no throttling losses, but up until now this has not been possible because such spark-ignited engines require a fuel to air ratio mix versus retained exhaust gas within a fairly narrow range of values for successful ignition. Control of such an engine, then, requires some measure of control over both the quantity of fuel entering the cylinder and a control of the quantity of air entering the cylinder as well as the quantity of retained exhaust gas. The control of the quantity of air entering the cylinder has, up until now, been controlled by a restriction or throttling of the air path into the cylinder against which piston motion had to work to suck the desired quantity of air into the cylinder. Such throttling has been so commonplace that the traditional name attached to the engine speed control in aircraft, boats, steam engines and many other craft is "throttle".

A two-stroke-cycle spark-ignited engine utilizing a conventional ignition system and having a fuel injector which introduces a controlled quantity of fuel directly into the closed end of the cylinder cavity has also been proposed. This engine utilizes the traditional cylinder sidewall intake ports receiving pressurized scavenging air from a positive displacement blower and cylinder sidewall exhaust ports which, in addition to being opened and closed by piston travel, are valved by rotary exhaust valves. The exhaust valving of this known Otto cycle engine appear to be either chain or cam driven, but, in either case, appears to be fixed in its timing.

The prior art has recognized numerous advantages which might be achieved by replacing such cam actuated or similar valve arrangements with other types of valve opening mechanism which could be controlled in their opening and closing as a function of engine speed as well as engine crankshaft angular position or other engine parameters.

U.S. Pat. No. 4,945,870 entitled Vehicle Management Computer discloses a computer control system which receives a plurality of engine operation sensor inputs and in turn controls a plurality of engine operating parameters including ignition timing and the time in each cycle of the opening and closing of the intake and exhaust valves among others. This patent teaches numerous operating modes or cycles in addition to the conventional four-stroke cycle. In particular, this patent discloses the principles suitable for implementing a control computer for the method of the present invention.

U.S. Pat. No. 4,878,464 entitled Pneumatic Bistable Electronic Valve Actuator, discloses a valve actuating device which is a jointly pneumatically and electromagnetically powered valve with high pressure air supply and control valving to use the air for both damping and as one motive force. A magnetic motive force is supplied from the magnetic latch opposite the one being released and this magnetic force attracts an armature of the device so long as the magnetic field of the first latch is in its reduced state. As the armature closes on the opposite latch, the magnetic attraction increases and overpowers that of the first latch regardless of whether it remains in the reduced state or not. This patent also discloses different operating modes including delayed intake valve closure and a six stroke cycle mode of operation.

U.S. Pat. No. 4,875,441 entitled Enhanced Efficiency Valve Activator discloses a further valve actuator which would be suitable in implementing the method of the present invention. This patent further includes a good summary of the state of the art in valve actuators at the time the application was filed.

U.S. Pat. Nos. 4,945,870, 4,878,464 and 4,875,441 are specifically incorporated herein by reference. These patents are all assigned to the assignee of the present invention.

As suggested in U.S. Pat. Nos. 4,878,464 and 4,945,870, a four-stroke-cycle engine having variably timed intake and exhaust valves could be operated in a six-stroke-cycle mode. The additional essentially adiabatic compression and expansion strokes more thoroughly evaporating the fuel and mixing the fuel and air. This permits burning low vapor pressure fuels in a four-stroke-cycle spark ignited engine under cold start conditions.

Automotive fuel, by evaporation, is a major contributor to atmospheric hydrocarbons which cause smog. The major sources of evaporative emissions are carburetors, fuel tanks, storage and transfer facilities at local outlets (gas stations), and major distribution systems. The evaporation problem is exacerbated by the use of high vapor pressure gasoline having highly volatile constituents which make it possible to start spark ignited engines over a wide temperature range.

FIG. 1 shows the effect of temperature on the vapor pressure of a typical modern gasoline; at present this pressure runs 9–13 psig at 100° F. FIG. 2 shows the effect of temperature on the vapor pressure of isooctane, which is the major constituent of gasoline without volatile additives. The vapor pressure of isooctane is only about 1.7 psig at 100° F. FIG. 3 shows the vapor pressure of paraffins and olefins at 100° F. versus number of carbon atoms per molecule. Butane ($C_4H_{10}$) and heptane ($C_7H_{16}$) are typical paraffins added to gasoline to increase the vapor pressure. FIG. 4 is a plot of experimentally measured fuel tank evaporative emissions versus Reid vapor pressure (RVP) of the gasoline in a 25 gallon tank containing ten gallons of gasoline. If the RVP is reduced from 10 to 5 psig, the fuel loss due to evaporative emissions is reduced from 70 g to 5 g, or about 1400%. However, starting problems at low ambient or equipment temperatures become progressively more serious as the RVP is reduced.

SUMMARY OF THE INVENTION

The invention involves a spark ignited, fuel injected internal combustion engine of the type having a piston reciprocable in a cylinder, intake ports for admitting air into the cylinder, and an exhaust valve that is opened and closed by valve actuator means independent of crankshaft position. According to the invention, such an engine is operated as follows:

1. During a first stroke wherein the piston moves from BDC to TDC, air is admitted to the cylinder via the intake ports. The intake ports are closed by movement of the piston and the exhaust valve is closed, whereupon fuel is injected into the cylinder. During the remainder of the stroke the fuel-air mixture is compressed, which causes it to be heated and to a certain degree evaporated.

2. During a second stroke wherein the piston moves from TDC to BDC, the exhaust valve is kept closed, thereby lowering the pressure of the fuel-air mixture and evaporating the fuel in the air. Near BDC the cylinder is exposed to intake air, but there is little ingestion (or loss of fuel-air mixture) due to the internal cylinder pressure being essentially equal to the applied air pressure at the ports.

3. During a third stroke wherein the piston moves from BDC to TDC, the intake ports are closed and the pressure of the fuel-air mixture again increases. This increases the temperature of the mixture, which further evaporates the fuel, and also homogenizes the mixture. Ignition occurs either after the intake ports close or after the exhaust valve closes, whichever is later, generally 5 to 15 degrees before TDC.

4. During a fourth stroke wherein the piston moves from TDC to BDC, the expanding fuel-air mixture powers the piston downward until the exhaust valve opens, whereafter the intake ports open to purge the exhaust gas with incoming air. The purge continues into the first stroke of the next cycle; the timing of the exhaust valve closure during the first stroke depends primarily upon the magnitude of the charge that is desired to meet the torque demand placed on the engine, and to a lesser extent upon the RPM.

Once the engine is up to operating temperature, even low vapor pressure fuels can be evaporated by engine heat, whereupon the engine can revert to two-stroke-cycle operation.

An engine operating as described above can start and run on fuels having a broad range of vapor pressures, including low volatility fuels such as isooctane. The compression ratio may be effectively varied by adjusting the volumetric efficiency (by the timing closing the exhaust valve), and by adjusting the fuel-air ratio (by regulating the quantity of fuel injected). Note that as the compression ratio is decreased, the expansion ratio is increased, thereby increasing the efficiency of partial load operation.

In addition to facilitating low temperature starting on low vapor pressure fuel, operation in the 4-stroke-cycle reduces engine warm-up time. Once the engine is hot, use of low RVP fuels reduces vapor lock problems and facilitates hot starting with less dependence upon four-stroke-cycle interim operation.

As discussed above in conjunction with FIGS. 1–4, the use of low vapor pressure fuels improves the environment by vastly reducing evaporative emissions. Further, since low vapor pressure fuels have a much higher flash point than gasoline, storage and handling of such fuels is considerably safer.

DETAILED DESCRIPTION OF THE PREFERRED EMBODIMENT

Figure 1:
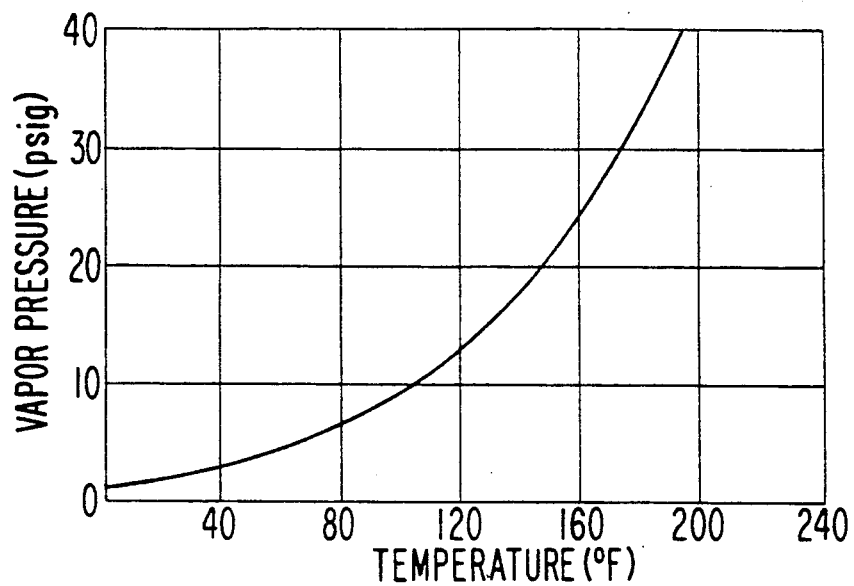
FIG. 1 is a plot of vapor pressure versus temperature for gasoline.
Figure 2:
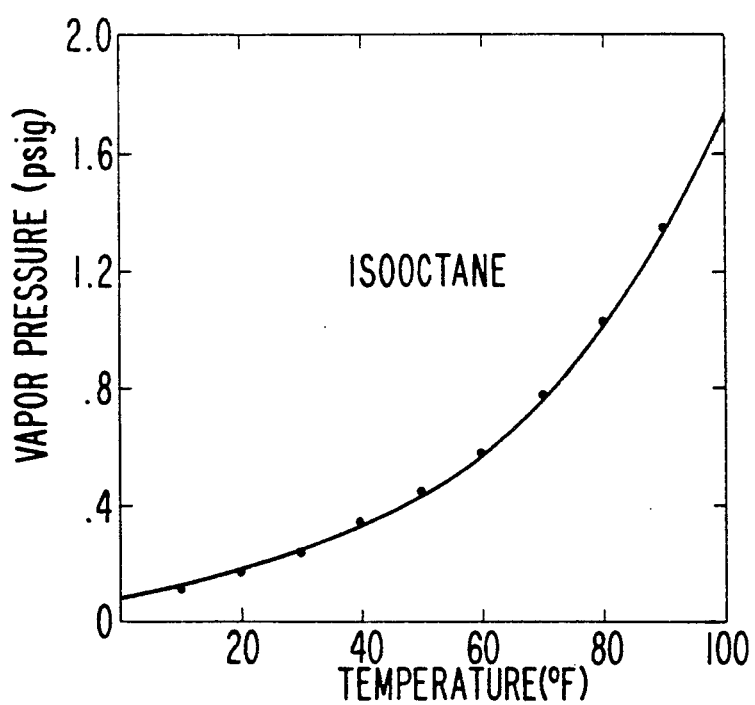
FIG. 2 is a plot of vapor pressure versus temperature for isooctane.
Figure 3:
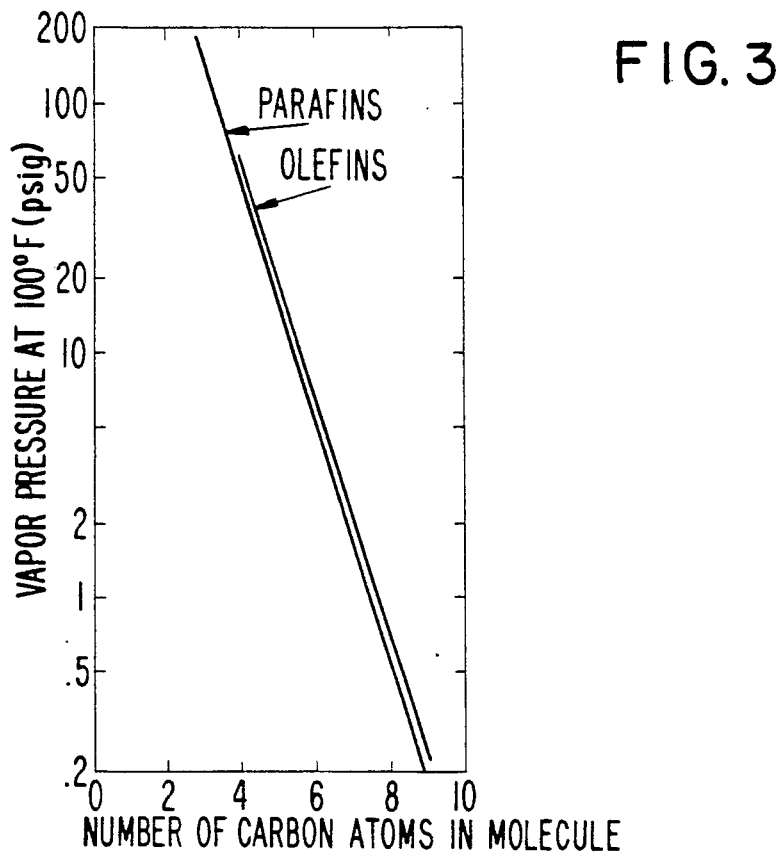
FIG. 3 is a plot of vapor pressure versus number of C-atoms for paraffins and olefins.
Figure 4:
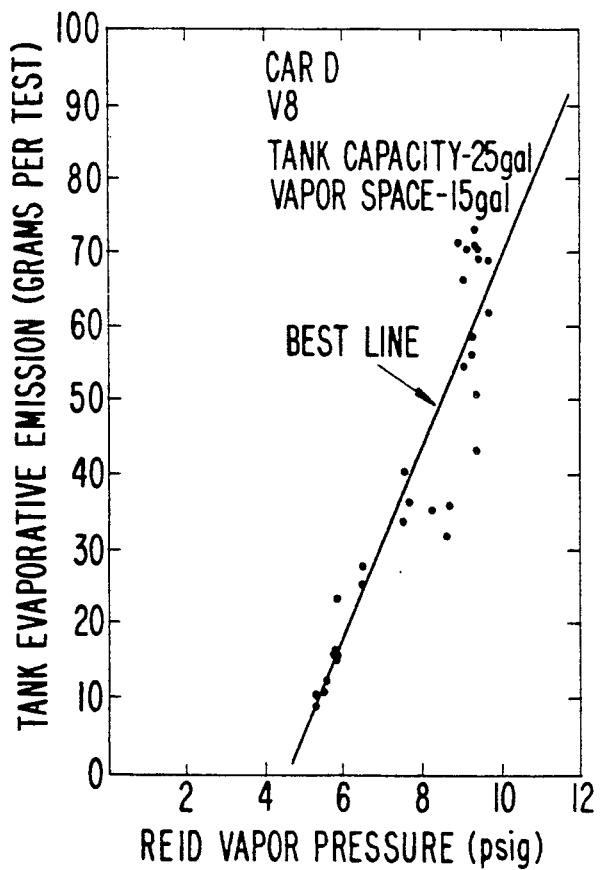
FIG. 4 is a plot of evaporative emissions versus vapor pressure in a gas tank.
Figure 5:
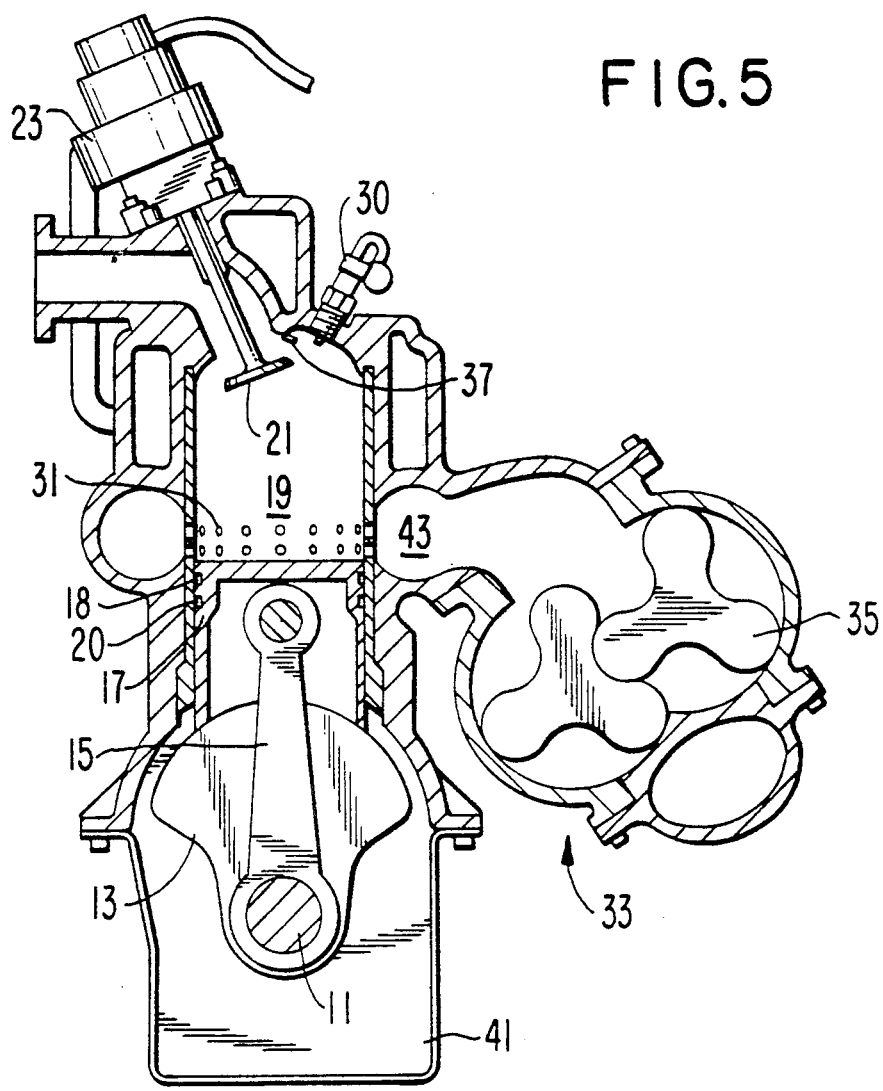
FIG. 5 is a cross section through one engine cylinder with the piston at BDC during exhaust blow down prior to the first stroke.
Figure 17:
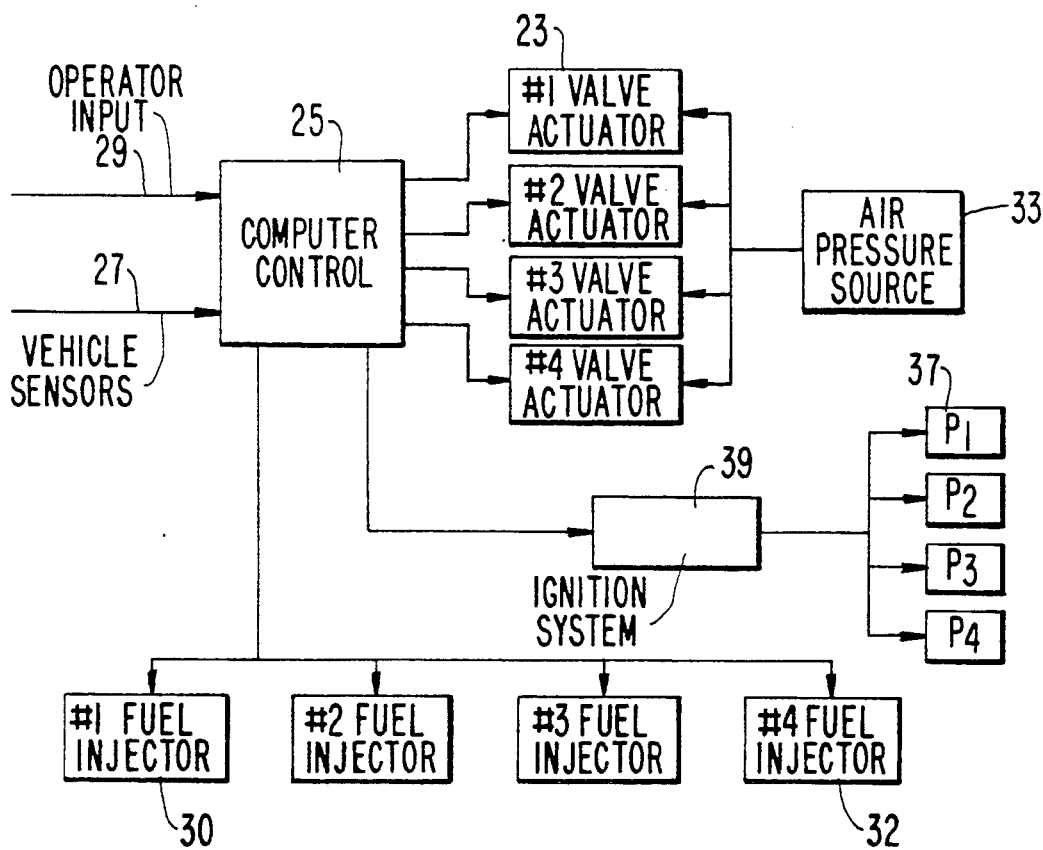
FIG. 17 is a schematic illustration of a computer control for an illustrative four cylinder engine.

Referring to FIG. 5, the internal combustion engine used to practice the invention has a crankshaft 11 with conventional counterbalancing 13 and connecting rod 15 coupled to a piston 17. While only one cylinder 19 is illustrated in FIG. 5, it will be understood that each cylinder of a typically multi-cylinder engine has common features such as an exhaust poppet valve 21 for each cylinder of the engine along with a valve actuator 23 which is operable on a first command as from a computer control 25 (FIG. 17) to open the cylinder poppet valve as well as being operable on a second command to close a cylinder poppet valve. The computer control selectively determines the time of occurrence of the second command in accordance with a desired engine output characteristic. The engine will typically be operated at a controlled fuel to air mixture ratio by varying the time in the cycle at which the exhaust valve 21 is closed under varying load conditions as determined by vehicle 27 and operator 29 inputs, and correspondingly varying the quantity of fuel introduced into the engine by fuel injectors 30 and 32 located in the engine head so as to maintain the controlled ratio of fuel to air in the piston or combustion chamber 19 at the time of ignition. The quantity of fuel is determined by the duration of the injectors opening, which in turn is controlled by a computer (FIG. 17). Typically, the exhaust valve will be open longer and, therefore, a lesser quantity of air will be retained in the cylinder during each cycle under reduced load conditions. Thus, the time or rotational position in the cycle at which the exhaust valve should be closed to trap an optimum quantity of air for a given engine power level is first determined and then the quantity of fuel to be ingested is selected accordingly to maintain a desired combustible fuel-to-air ratio.

Each combustion chamber or cylinder 19 has a series of intake ports 31 which are selectively opened and closed by piston motion. These openings 31 communicate with a manifold 43 connected to a source of pressurized combustion air 33 such as a positive displacement pump 35 to supply air to the cylinder while the piston 17 is in a position (down as viewed). As shown, sump 41 is an actual oil sump for lubricating the engine bearings, but it may, in relatively small engines, provide the function of pumping air into the cylinder on the down stroke of the piston as is known in two-stroke cycle engines if desired.

Figure 13:
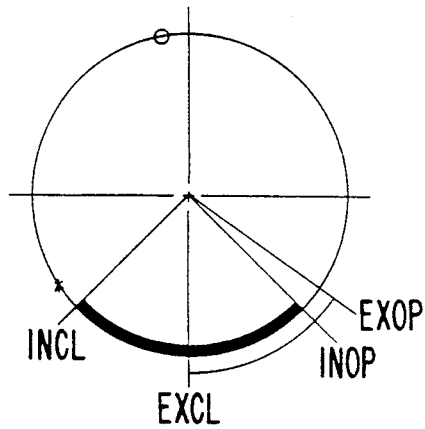
FIGS. 13–15 are illustrative engine timing diagrams for high torque operation at 500, 1500, and 4500 RPM in a two-stroke cycle mode.
Figure 14:
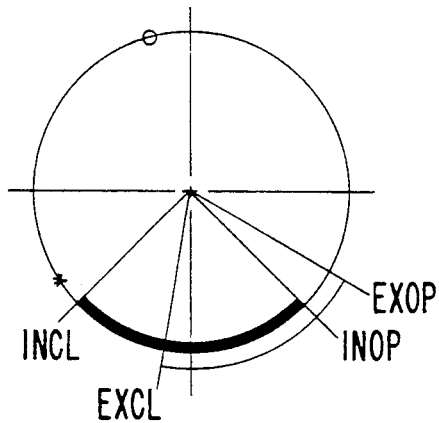

As shown in FIG. 5, the intake ports 31 are wide open and the cylinder or combustion chamber 19 is being scavenged of the exhaust gases by a Roots type positive displacement blower 35. The scavenging (fresh) air enters the lower ports 31 which extend about the periphery of the cylinder sidewall and sweeps upwardly through the cylinder and carries these gases out through the exhaust port of the open exhaust valve 21. If high power at low speed is desired, the exhaust valve 21 may be closed with the piston 17 close to bottom dead center. This will allow the maximum entrapment of fresh air and some supercharging while the inlet ports 31 are still open. If high power at high speed is desired, the exhaust valve 21 may be closed just before the piston covers the intake ports. At this point, the scavenging is completed at high speed and the entrapped air will occupy all of the cylinder volume above the inlet ports. Once the exhaust valve 21 has closed, the fuel injector 30 will fire a proportionate amount of atomized fuel into the cylinder. The time of such fuel injection is shown by an * in FIGS. 10-16 and occurs generally at a point in the engine cycle which varies with the demand placed on the engine yet always a fixed rotational increment after closure of the cylinder exhaust valve or that same fixed rotational increment after closure of the cylinder intake port whichever is later in the cycle. Thus, in FIGS. 10, 11 and 12, the low torque conditions, fuel injection occurs a fixed angle after the exhaust valve closes while for the high torque conditions of FIGS. 13-15 the fixed angle is after closure of the intake port.

The time in the cycle at which an exhaust valve is closed under varying load and engine speed conditions and therefore also the quantity of fuel introduced into the engine combustion chamber are both varied so as to maintain a desired ratio of fuel to air in the combustion chamber at the time of ignition. Generally speaking, the exhaust valve is open longer during each cycle under reduced load conditions. The exhaust valve is closed at a point in the cycle to entrap a quantity of air appropriate to operating at a desired engine speed and an amount of fuel appropriate to that desired engine speed is subsequently introduced into the entrapped quantity of air. The amount of atomized fuel injected into the cylinder is selected, as determined at least in part by the time of closing of the exhaust valve, to always provide a controlled air/fuel ratio to the combustion chamber. If lower power is desired, the exhaust valve is simply left open longer to allow the piston to push more air out of the exhaust port so that when the exhaust valve does close a smaller volume of air is entrapped. A correspondingly smaller volume of fuel is then injected.

Figure 6:
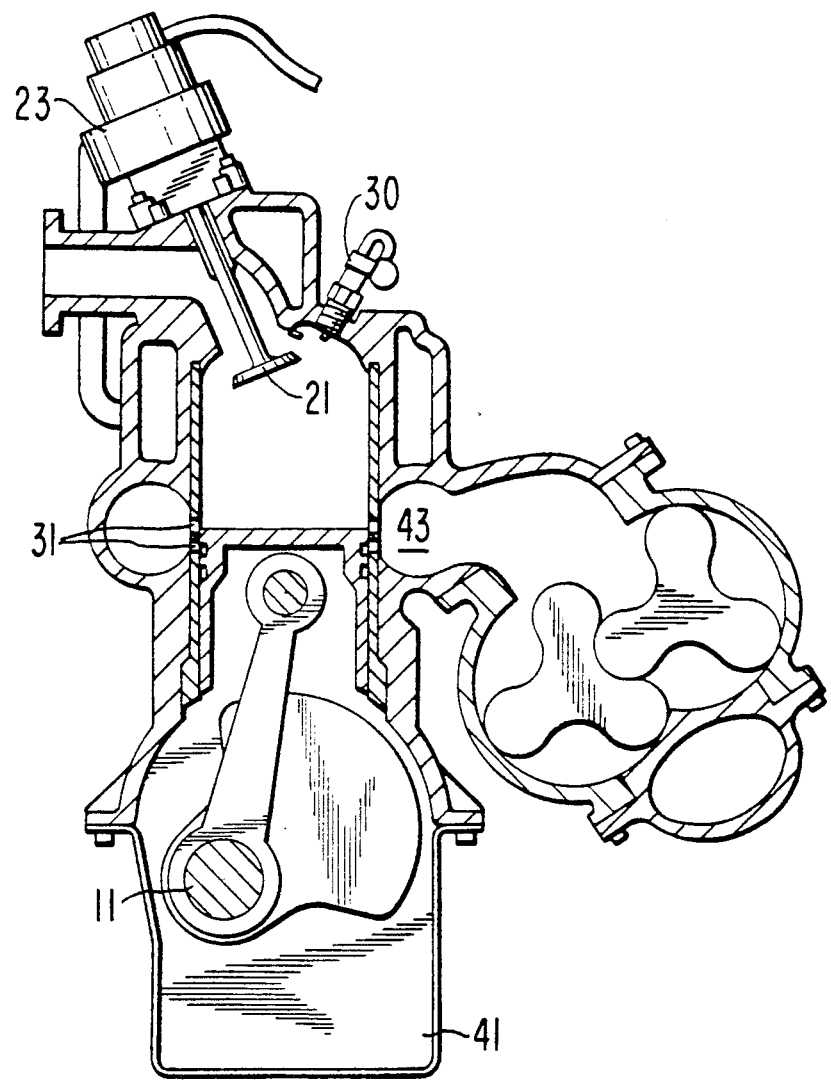
FIG. 6 shows the piston about 120° before TDC during the first stroke, immediately after the air intake ports are closed by the piston.
Figure 10:
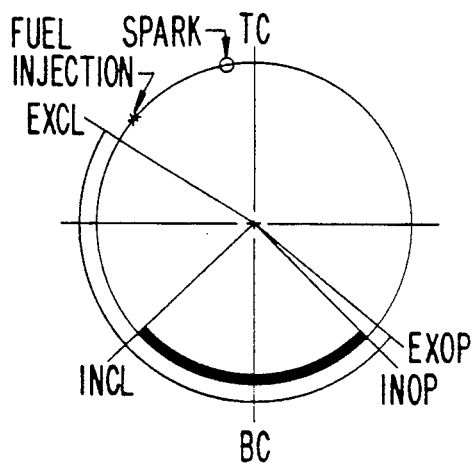
FIGS. 10–12 are illustrative engine timing diagrams for low torque operation at 500, 1500, and 4500 RPM in a two-stroke cycle mode.
Figure 11:
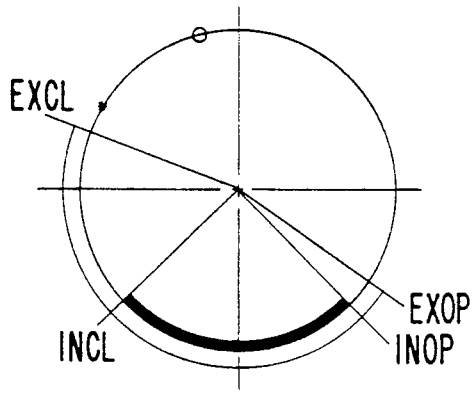
Figure 12:
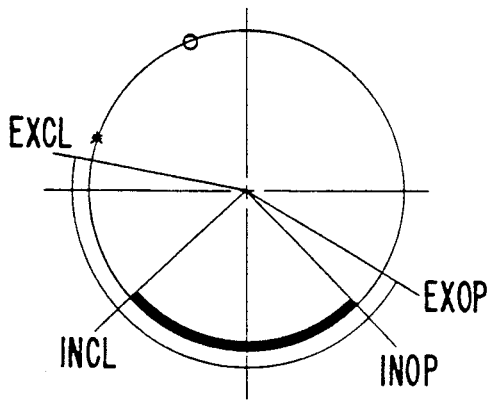

FIG. 6 shows the piston about 120° before TDC, after the intake ports 31 are closed but before the exhaust valve 21 closes. It is clearly a low torque situation as depicted schematically in FIGS. 10-12. Under high torque requirements, as depicted schematically in FIGS. 13-15, the exhaust valve would already be closed to permit supercharging the cylinder with air. As shown in FIGS. 10-12, the timing of the exhaust valve closure is dependent upon RPM, closing earlier with increasing engine speed under low torque conditions. Under high torque conditions (FIGS. 13-15), the exhaust valve closes later with increasing RPM.

Figure 7:
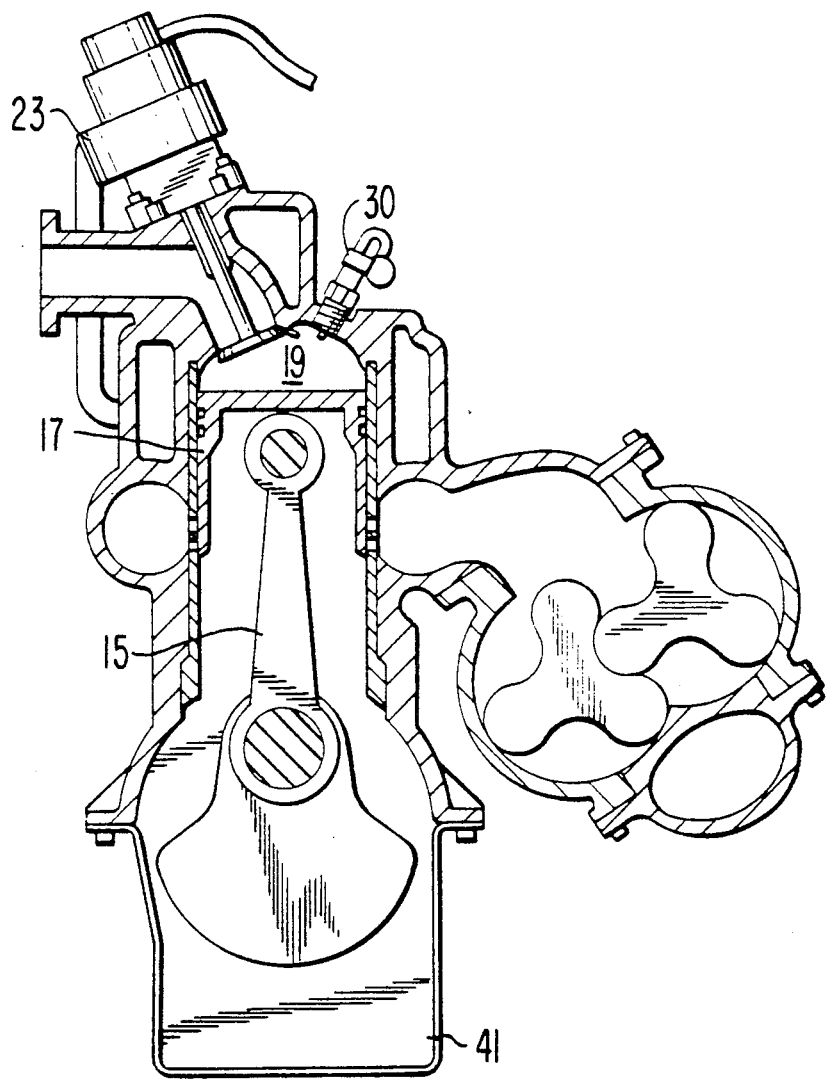
FIG. 7 shows the piston at TDC between either the first and second strokes or between the third and fourth strokes of the cycle.

FIG. 7 shows the piston 17 at TDC after closing the exhaust valve 21 and injecting the fuel via injector 30. Contrary to the situation depicted in FIGS. 10-15, however, ignition (indicated by a o) has not occurred. The present invention relates to operation in a four-stroke-cycle mode wherein an additional expansion stroke and an additional compression stroke are provided prior to ignition. The crankshaft thus rotates through 720° in a full cycle, rather than 360°.

Figure 15:
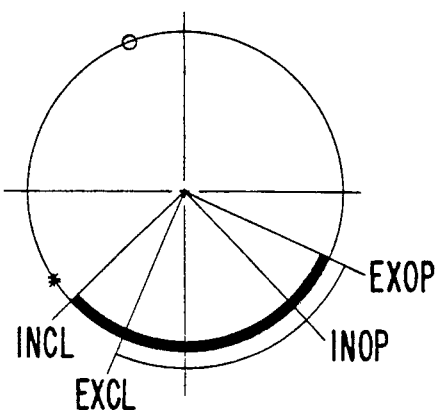
Figure 16:
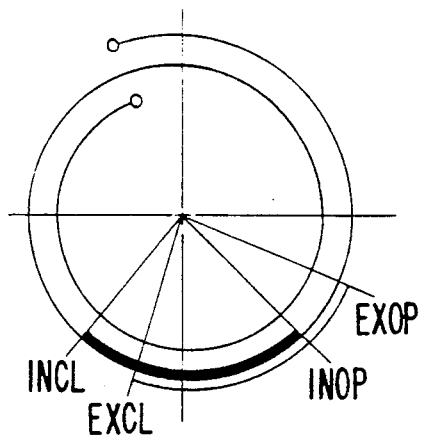
FIG. 16 is an illustrative engine timing diagram for high torque, high speed operation in the four-stroke-cycle mode.

FIG. 16 shows the full 720° cycle of the present invention, and corresponds to the high torque conditions of FIG. 15. The condition of FIG. 7 therefore occurs at the 12 o'clock position in FIG. 16, after injection (*), but nearly 360° prior to ignition (o).

Figure 8:
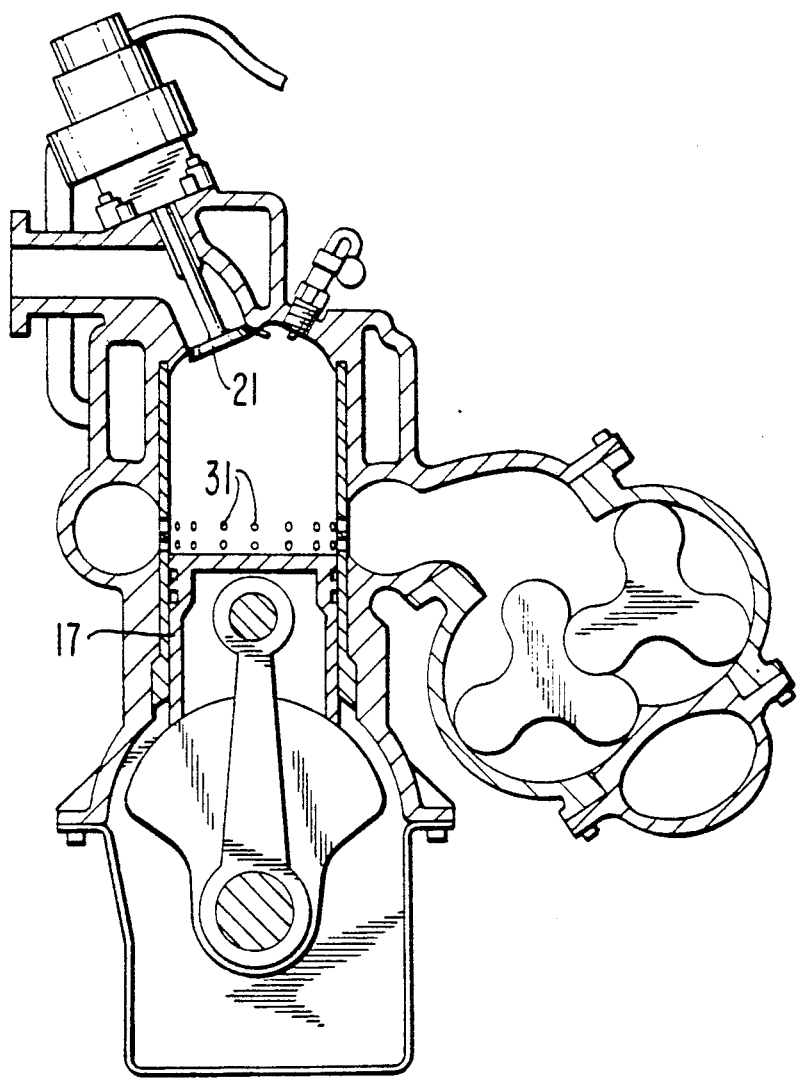
FIG. 8 shows the piston at BDC between the second and third strokes of the cycle.

FIG. 8 shows the piston 17 at the conclusion of the second stroke, wherein the exhaust valve 21 is kept closed and the fuel-air mixture is greatly expanded, thus reducing the pressure and enhancing evaporation of the fuel. The air intake ports 31 are fully open at this point, but there is little if any net flow due to a pressure equilibrium. There has been little net pressure increase in the mixture since the temperature increase during compression is countered by the temperature reduction during expansion. After the position of FIG. 8, the mixture undergoes a second compression, wherein any unevaporated fuel particles are gassified by the heat due to compression.

Figure 5A:
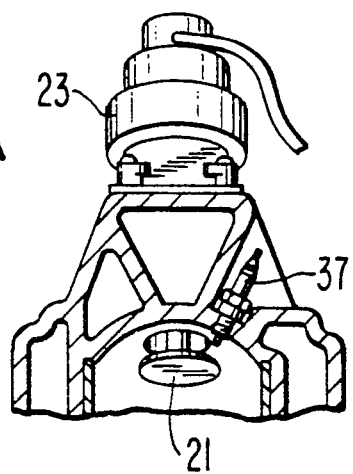
FIG. 5A is a cross sectional view of the upper portion of the cylinder of FIG. 1 in a plane orthogonal to the plane of FIG. 1.

FIG. 7, in addition to showing the piston after the first stroke, also shows the piston at the conclusion of the third stroke, after ignition by spark igniter 37 (FIG. 5A) occurs. The time of the ignition, indicated by "o" in FIG. 16, is nearly a constant angle prior to TDC, with some advance occurring with increasing engine speed.

Figure 9:
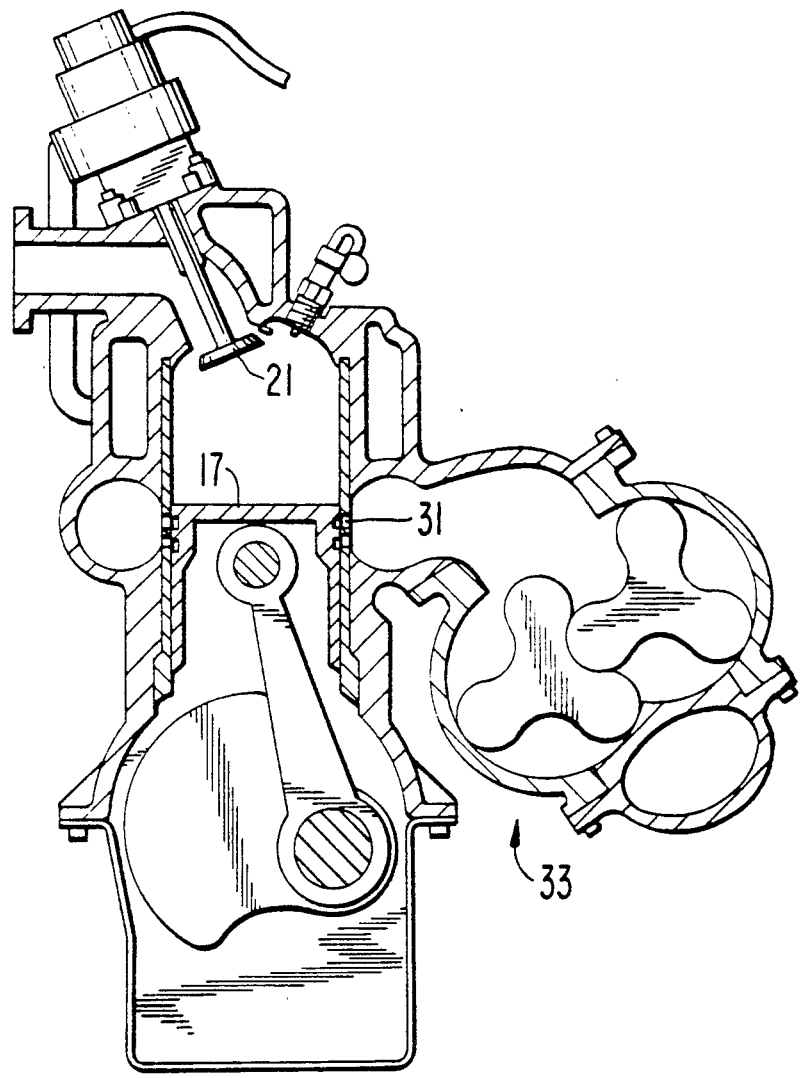
FIG. 9 shows the piston about 120° after TDC during the fourth stroke just as the exhaust valve opens.

FIG. 9 shows the piston 17 about 120° after TDC during the fourth or power stroke, just at the end of the gas expansion, as the exhaust valve 21 is opening prior to the piston uncovering the intake ports. Following this, and inclusive of the position of FIG. 5, there is an exhaust gas blow-down. When the intake ports are opened the cylinder pressure has dropped below the air source pressure, and incoming air from source 33 purges the cylinder of residual exhaust gas.

Referring to FIG. 17, the illustrative cylinder of FIGS. 5-9 will frequently be in an engine having a multiplicity of pistons reciprocable in respective cylinders wherein each cylinder has at least one exhaust valve for each cylinder. Each valve is opened and closed by a respective valve actuator 23 to obtain means for adjusting each of the exhaust segments to provide a compression ratio in each of the cylinders which has a predetermined relationship to engine torque and speed. As shown in FIGS. 10-15, the compression ratio for low torque and the compression ratio for low speed is less than for high speed. Moreover, the vehicle computer 25 senses the engine torque and speed demands and provides control signals to each valve actuator 23 to cause it to open and close its respective valve to obtain the desired compression ratios. The computer 25 functions as a control means in response to engine load and engine speed to vary the exhaust segment of the cycle accordingly for opening the exhaust valve prior to the intake segment of the cycle and closing the exhaust valve at the completion of the exhaust segment whereby a sufficient charge of air is admitted into the cylinder to have substantially purged the cylinder of the burned gases from the previous ignition segment of the cycle and to introduce substantially clean air into the cylinder.

The overall control system for the present engine employs substantially the same principles as disclosed in U.S. Pat. No. 4,945,870, but differs therefrom in utilizing but a single valve actuator for each engine cylinder. The control computer 25 receives operator demand input signals on line 29 and input information on the current operation of the engine such as engine speed (RPM) on line 27. A source of high pressure air 33 is provided for powering the valve actuators 23 which may, for example, be of any one of the types summarized in the above mentioned U.S. Pat. No. 4,875,871.

The computer also issues commands for actuating the fuel injectors 30, 32 and the ignition system 39. As shown in FIG. 17, there is one valve actuator, one fuel injector and one spark plug 37 for each one of four different engine cylinders.

The foregoing is exemplary and not intended to limit the scope of the claims which follow.

What is claimed is:

1. Method of operating an internal combustion engine of the type comprising a piston reciprocable in a cylinder, intake port means for admitting air into the cylinder, an exhaust valve that is opened and closed by valve actuator means independent of crankshaft position, spark ignition means, and fuel injection means, said method comprising the following steps during a four stroke cycle during a first stroke wherein the piston moves from BDC to TDC, admitting air to the cylinder via said intake port means, closing the intake port means by movement of said piston, closing the exhaust valve, and injecting the fuel into the cylinder, during a second stroke wherein the piston moves from TDC to BDC, maintaining the exhaust valve in the closed position, thereby lowering the pressure of the fuel air mixture, during a third stroke wherein the piston moves from BDC to TDC, increasing the pressure of the fuel air mixture followed by spark-igniting the mixture, during a fourth stroke wherein the piston moves from TDC to BDC, expanding the ignited fuel air mixture followed by opening said exhaust valve and said intake port, thereby purging the cylinder of exhaust gas.

2. Method as in claim 1 wherein said air is admitted to said cylinder under pressure.

3. Method as in claim 1 wherein said exhaust valve is closed during the first stroke prior to closing the intake port, said fuel being injected after closing the intake port.

4. Method as in claim 3 wherein said exhaust valve is closed at BDC.

5. Method as in claim 1 wherein the exhaust valve is closed during the first stroke after closing the intake port, said fuel being injected after closing said exhaust valve.

* * * * *